(12) United States Patent
Kanoh et al.

(10) Patent No.: US 8,581,557 B2
(45) Date of Patent: Nov. 12, 2013

(54) DIRECT-CURRENT POWER SOURCE APPARATUS

(75) Inventors: Mitsuyoshi Kanoh, Saitama (JP); Masahiko Amano, Ibaraki (JP); Yukio Iida, Saitama (JP); Yoshiki Hama, Saitama (JP); Keizo Yamada, Saitama (JP)

(73) Assignee: Shin-Kobe Electric Machinery Co., Ltd., Tokyo (JP)

( * ) Notice: Subject to any disclaimer, the term of this patent is extended or adjusted under 35 U.S.C. 154(b) by 444 days.

(21) Appl. No.: 13/048,267

(22) Filed: Mar. 15, 2011

(65) Prior Publication Data

US 2011/0227540 A1     Sep. 22, 2011

(30) Foreign Application Priority Data

Mar. 17, 2010  (JP) .................................. 2010-061184
Feb. 10, 2011  (JP) .................................. 2011-027574
Feb. 14, 2011  (JP) .................................. 2011-029003

(51) Int. Cl.
  *H02J 7/00*        (2006.01)
(52) U.S. Cl.
  USPC ........... 320/135; 320/118; 320/120; 324/426; 340/636.1; 340/636.21
(58) Field of Classification Search
  USPC ......................................................... 320/135
  See application file for complete search history.

(56) References Cited

U.S. PATENT DOCUMENTS

| | | | | |
|---|---|---|---|---|
| 5,652,501 | A | * | 7/1997 | McClure et al. .......... 340/636.15 |
| 6,075,331 | A | * | 6/2000 | Ando et al. .................... 318/376 |
| 2004/0232881 | A1 | * | 11/2004 | Amano et al. ................. 320/104 |
| 2005/0093370 | A1 | * | 5/2005 | Amano et al. ................ 307/10.1 |
| 2006/0012372 | A1 | * | 1/2006 | Emori et al. ................... 324/413 |
| 2006/0097577 | A1 | | 5/2006 | Kato et al. |
| 2009/0251103 | A1 | * | 10/2009 | Yamamoto et al. ........... 320/133 |
| 2010/0244847 | A1 | * | 9/2010 | Kudo et al. .................... 324/433 |

FOREIGN PATENT DOCUMENTS

| | | |
|---|---|---|
| JP | 3-104002 U | 10/1991 |
| JP | 6-270695 A | 9/1994 |
| JP | 2004-266888 A | 9/2004 |
| JP | 2009-112122 A | 5/2009 |
| JP | 2010-4587 A | 1/2010 |

* cited by examiner

*Primary Examiner* — Yalkew Fantu
(74) *Attorney, Agent, or Firm* — Crowell & Moring LLP

(57) ABSTRACT

A direct-current power source apparatus in which a lithium-ion capacitor unit is used as an electric storage system and which can fully utilize the lithium-ion capacitor unit and maintain the supply of electricity to a load is provided. An electric storage system includes a lithium-ion capacitor unit and a lead-acid battery connected in parallel with a load, and a voltage detecting section that detects the voltage of the lithium-ion capacitor unit. When the voltage detecting section detects that the voltage of the lithium-ion capacitor unit has reached a unit lower-limit voltage, a control circuit outputs a conduction signal for causing a switching circuit to get into a conductive state. When the switching circuit gets into a conductive state, the secondary battery supplies an electric power to a motor. At this time, the secondary battery charges the lithium-ion capacitor unit.

20 Claims, 7 Drawing Sheets

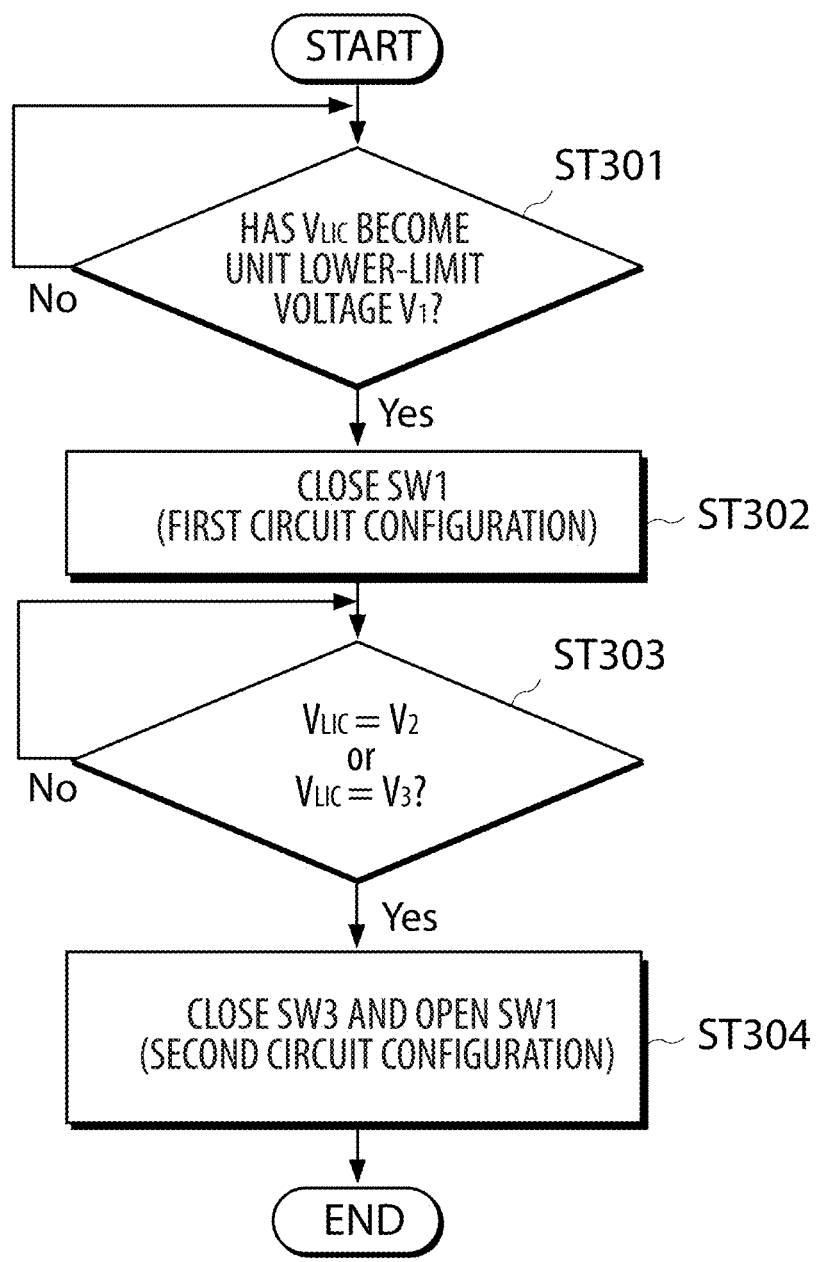

DIRECT-CURRENT POWER SOURCE APPARATUS

BACKGROUND OF THE INVENTION

1. Field of the Invention

The present invention relates to a direct-current power source apparatus that supplies a load with a direct-current power discharged from an electric storage system.

2. Description of the Related Art

Conventional direct-current power source apparatuses use a capacitor or condenser with a relatively high capacitance to supply a direct-current power to a load such as a motor of an electric vehicle. See Japanese Utility Model Application Publication No. 03-104002 (JPU03-104002A) for example. Because the capacitor becomes unable to supply an electric power when charge falls short, conventional direct-current power source apparatuses additionally use a secondary battery to extend the time of use of a direct-current power. See Japanese Patent Application Publication No. 06-270695 (JP06-270695A), Japanese Patent Application Publication No. 2009-112122 (JP2009-112122A), Japanese Patent Application Publication No. 2004-266888 (JP2004-266888A), and Japanese Patent Application Publication No. 2010-4587 (JP2010-004587A), for example. In particular, Japanese Patent Application Publication No. 2009-112122 (JP2009-112122A) and Japanese Patent Application Publication No. 2010-4587 (JP2010-004587A) disclose that a lithium-ion capacitor is used as a high-capacitance capacitor to provide the maximum required electric power and to reduce the maximum electric power required for the secondary battery.

If the lithium-ion capacitor is overdischarged with its voltage falling below a lower-limit voltage inevitably determined by its characteristics, however, the lithium-ion capacitor may lose its original characteristics even if recharged. Therefore, it is difficult to fully utilize the lithium-ion capacitor in the conventional direct-current power source apparatus.

Meanwhile, the secondary battery tends to be degraded by quick charging and discharging, overdischarging, and overcharging compared to the lithium-ion capacitor, and thus may be degraded if controlled by a conventional control method. For example, in the configuration disclosed in Japanese Patent Application Publication No. 2004-266888 (JP2004-266888A), the secondary battery is connected in parallel with a main power source via a relay. Therefore, an unlimitedly large load may be connected to the secondary battery during charging and discharging. In the configuration disclosed in Japanese Patent Application Publication No. 2010-4587 (JP2010-004587A), the secondary battery is frequently used. In addition, an electric power is consumed at all times because a DC/DC converter is used at all times.

SUMMARY OF THE INVENTION

An object of the present invention is to provide a direct-current power source apparatus in which a lithium-ion capacitor unit formed by connecting a plurality of lithium-ion capacitors in series with each other is used as an electric storage system and which can fully utilize the lithium-ion capacitors and maintain the supply of an electric power to a load.

Another object of the present invention is to provide a direct-current power source apparatus in which a lithium-ion capacitor unit is used as a main power source and a secondary battery is used as an auxiliary power source and in which a burden on the secondary battery is reduced to suppress degradation of the secondary battery and extend the life thereof.

Yet another object of the present invention is to provide a direct-current power source apparatus capable of stably supplying an electric power.

Still another object of the present invention is to provide a direct-current power source apparatus in which lithium-ion capacitors are used and in which an electric power can be supplied to a load over an extended time.

A further object of the present invention is to provide a method of efficiently charging a direct-current power source apparatus including a lithium-ion capacitor unit and a secondary battery.

A still further object of the present invention is to provide a direct-current power source apparatus in which a secondary battery can be charged under conditions that are suitable for an ambient temperature at which the direct-current power source apparatus is used.

A direct-current power source apparatus of the present invention comprises: a lithium-ion capacitor unit connected in parallel with a load; a secondary battery connectable in parallel with the load and the lithium-ion capacitor unit; a voltage detecting section for detecting a voltage of the lithium-ion capacitor unit; and a changeover circuit configured to connect the secondary battery in parallel with the load and the lithium-ion capacitor unit.

In general, a single lithium-ion capacitor provides a voltage of about 3.8 V. Therefore, the lithium-ion capacitor unit is formed by connecting a plurality of lithium-ion capacitors in series with each other to provide an output voltage required for the application. The secondary battery may be any type of battery that is capable of being charged and discharging electricity such as a lead-acid battery or a lithium-ion battery, for example.

In the present invention, in order to avoid a situation in which the voltage of each of the lithium-ion capacitors forming the lithium-ion capacitor unit falls below the lower-limit voltage discussed above, the voltage detecting section detects the voltage of the lithium-ion capacitor unit, and when the voltage of the lithium-ion capacitor unit reaches the unit lower-limit voltage, the changeover circuit connects the secondary battery in parallel with the lithium-ion capacitor unit to prevent the respective voltages of the plurality of lithium-ion capacitors in the lithium-ion capacitor unit from falling down to or below the lower-limit voltage. At the same time, the changeover circuit connects the secondary battery to the load to continue the supply of an electric power to the load. As a result, according to the present invention, it is possible to fully utilize the lithium-ion capacitors and to maintain the supply of the electric power to the load without reducing the life of the lithium-ion capacitors. Further, because the secondary battery is ordinarily not used, a secondary battery with a small capacity is sufficient, thereby reducing the size of the direct-current power source apparatus. Moreover, Charging and discharging of the secondary battery is repeated less frequently, thereby extending the life of the secondary battery.

The term "unit lower-limit voltage" used herein refers to a voltage that is higher than the sum of the lower-limit voltages of the plurality of lithium-ion capacitors connected in series with each other and that is lower than the rated voltage of the secondary battery. The unit lower-limit voltage prevents the voltage of each of the lithium-ion capacitors from falling down to or below the lower-limit voltage.

The direct-current power source apparatus according to the present invention is suitable for such a situation that suspended operation hinders the work such as an automated guided vehicle (AGV) driven by a motor. In general, if the voltage of the lithium-ion capacitor unit in an automated guided vehicle has decreased, the automated guided vehicle returns to a standby station so that the lithium-ion capacitor unit is charged using a charging device which is an external charger. If the voltage of the lithium-ion capacitor unit falls down to or below the unit lower-limit voltage, the secondary battery is connected in parallel with the lithium-ion capacitor unit to continue the supply of an electric power to the motor so that the automated guided vehicle can return to the standby station, even if there is no standby station nearby. The secondary battery can serve not only as a power source for the load but also as a power source for charging the lithium-ion capacitor unit.

The changeover circuit may arbitrarily be configured, provided that the changeover circuit may be able to perform the switching operation discussed above. For example, the changeover circuit may include a controllable switching circuit such as a semiconductor switch or an electromagnetic switch. Such a switching circuit may be disposed as follows. A pair of input/output portions of the lithium-ion capacitor unit are connected to a pair of input portions of the load. One of the paired input/output portions of the lithium-ion capacitor unit is electrically connected to one of the paired input/output portions of the secondary battery. Then, the switching circuit is disposed between the other input/output portion of the lithium-ion capacitor unit and the other input/output portion of the secondary battery. The switching circuit may get into a conductive state when the voltage detecting section detects the unit lower-limit voltage. In this configuration, the switching circuit may be controlled to perform the operations as follows: the lithium-ion capacitor unit supplies electric power to the load if the voltage of the lithium-ion capacitor unit does not fall down to or below the lower-limit voltage; and the secondary battery charges the lithium-ion capacitor unit if the voltage of the lithium-ion capacitor unit falls down to or below the unit lower-limit voltage.

The electric storage system may further include a diode with an anode connected to one of the input/output portions of the lithium-ion capacitor unit and with a cathode connected to the input/output portion as a positive terminal of the secondary battery. According to this configuration, the secondary battery can be charged at the same time as the lithium-ion capacitor unit is charged using an external power source without separately providing a charger for the secondary battery while preventing the secondary battery from discharging electricity when the switching circuit is not conductive.

Preferably, the voltage detecting section is powered by the secondary battery. With this configuration, the capacity of the lithium-ion capacitor unit can be fully utilized for the load.

The changeover circuit maybe formed using a unidirectional conductive device such as a constant-voltage diode. In this case, one of the paired input/output portions of the lithium-ion capacitor unit, which are connected to the paired input portions of the load, and one of the paired input/output portions of the secondary battery may be electrically connected to each other. Then, a unidirectional conductive device may be electrically connected between the other input/output portion of the lithium-ion capacitor unit and the other input/output portion of the secondary battery. The unidirectional conductive device is configured to get into a conductive state when the voltage of the lithium-ion capacitor unit falls down to or below the unit lower-limit voltage. With this configuration, the unidirectional conductive device functions as the voltage detecting section and the changeover circuit. If a constant-voltage diode is used as the unidirectional conductive device, a constant-voltage diode having a Zener voltage of the unit lower-limit voltage or less may be used. According to this configuration, the changeover circuit can be formed without requiring a switching circuit that operates only under control. The lithium-ion capacitor unit can supply electric power to the load if the voltage of the lithium-ion capacitor unit does not fall down to or below the unit lower-limit voltage. The secondary battery can charge the lithium-ion capacitor unit if the voltage of the lithium-ion capacitor unit falls down to or below the unit lower-limit voltage.

In the present invention, the changeover circuit may be configured to switch between a first and second circuit configurations. In the first circuit configuration, the secondary battery is connected in parallel with the load and the lithium-ion capacitor unit via a first discharging circuit including current limiting means. In the second circuit configuration, the secondary battery is connected in parallel with the load and the lithium-ion capacitor unit via a second discharging circuit not including the current limiting means. When the secondary battery is connected in parallel with the load and the lithium-ion capacitor unit, the changeover circuit may initially be operated in the first circuit configuration. The changeover circuit may thereafter be switched to the second circuit configuration when it is detected that the voltage of the lithium-ion capacitor unit has risen to a first set voltage higher than the unit lower-limit voltage or that the voltage of the lithium-ion capacitor unit has fallen down to a second set voltage lower than the unit lower-limit voltage.

"When it is detected that the voltage of the lithium-ion capacitor unit has risen to a first set voltage higher than the unit lower-limit voltage" indicates that the secondary battery can supply required electric power to the load without flowing overcurrent through the load and can also charge the lithium-ion capacitor unit after the changeover circuit has been operated in the first circuit configuration. Therefore, the voltage of the lithium-ion capacitor unit has risen to the first set voltage which is higher than the unit lower-limit voltage. The first set voltage is set to prohibit the current discharged from the secondary battery to the load from becoming an overcurrent. Thus, in this state, the current limiting means fails to prevent the generation of overcurrent, but is merely a cause for electric power loss. Then, the changeover circuit switches into the second circuit configuration to disconnect the current limiting means, thereby avoiding the generation of an electric power loss in the current limiting means and alleviating the load on the secondary battery. As a result, this may retard deterioration of the capacity of the secondary battery.

In contrast therewith, "When it is detected that the voltage of the lithium-ion capacitor unit has falls down to a second set voltage that is lower than the unit lower-limit voltage" indicates that the load on the secondary battery is too heavy for the secondary battery to supply sufficient electric power to the load via the current limiting means at the time that the changeover circuit is switched to the first configuration and that the lithium-ion capacitor unit continuously discharges electricity. In this situation, if the current limiting means remains or is left in the discharging circuit, discharging from the lithium-ion capacitor unit continues, thereby causing a risk of decreasing the voltage of each of the lithium-ion capacitors to the lower-limit voltage. Thus, the changeover circuit switches into the second circuit configuration to disconnect the current limiting means, thereby supplying required electric power to the load and preventing a decrease in voltage of the lithium-ion capacitor unit. From such a viewpoint, the second set voltage is set to prohibit the voltage of each of the lithium-ion capacitors from falling down to the lower-limit voltage or less.

With the changeover circuit configured to switch between the first circuit configuration and the second circuit configuration as described above, it is possible to prohibit the secondary battery from discharging an overcurrent, thereby suppressing degradation of the secondary battery and also to suppress electric power loss, by switching the changeover circuit from the first circuit configuration into the second circuit configuration under specific conditions. In addition, it is possible to supply electric power required for the load.

Specifically, the second discharging circuit may be constituted from a short circuit that short-circuits the current limiting means in the first discharging circuit. With this, the configuration of the changeover circuit can be simplified.

As discussed above, the direct-current power source apparatus according to the present invention is suitable for an automated guided vehicle (AGV) driven by a motor or the like. In general, when the voltage of the lithium-ion capacitor unit in an automated guided vehicle has decreased, the automated guided vehicle returns to a standby station so that the lithium-ion capacitor unit is charged using a charging device which is an external charger. If the direct-current power source apparatus further includes a charging circuit that is brought into an operating state to charge the secondary battery when a charging voltage is applied to the lithium-ion capacitor unit by an external charger, the secondary battery and the lithium-ion capacitor unit are charged at the same time. The lithium-ion capacitor unit and the secondary battery are significantly different from each other in charging characteristics and charging time. If they are charged at the same time, charging of the lithium-ion capacitor unit is constrained by charging of the secondary battery which takes long time until charged. Thus, the charging time of the lithium-ion capacitor unit may be prolonged more than necessary. Therefore, the lithium-ion capacitor unit may not be effectively utilized. With the charging circuit connected at all times, the lithium-ion capacitor unit is enabled to charge the secondary battery at all times, which may cause electric power loss. Preferably, the charging circuit includes a switching circuit so that the secondary battery is charged when the switching circuit gets into a conductive state.

Alternatively, a method of charging the direct-current power source apparatus according to the present invention preferably includes: charging the lithium-ion capacitor unit with the secondary battery electrically disconnected from the direct-current charging power source; and charging the secondary battery with the lithium-ion capacitor unit electrically disconnected from the direct-current charging power source after the lithium-ion capacitor unit is completely charged. The secondary battery, the charging time of which is longer, can be charged utilizing a standby time or the like after the lithium-ion capacitor unit, the charging time of which is shorter, is charged. Therefore, the direct-current power source apparatus can be immediately made ready for use as necessary. Further, it may be possible to arbitrarily stop charging the secondary battery by the lithium-ion capacitor unit. The charging voltage of the lithium-ion capacitor unit is higher than the charging voltage of the secondary battery. Therefore, the charging circuit may include a DC/DC converter that decreases the charging voltage to a voltage suitable for charging the secondary battery. The DC/DC converter can control the voltage as desired. Therefore, a decrease in life of the secondary battery can be suppressed by charging the secondary battery with an appropriate charging voltage.

It is known that the voltage suitable for charging the secondary battery varies according to the ambient temperature of the secondary battery. Thus, in order to charge the secondary battery while preventing overcharging or insufficient charging, preferably, the direct-current power source apparatus further includes temperature detecting means for detecting an ambient temperature. Then, it may be preferable to allow the output voltage of the DC/DC converter included in the charging circuit to vary according to the ambient temperature. Specifically, the DC/DC converter may decrease the voltage suitable for charging the secondary battery when the temperature detected by the temperature detecting means is higher than a predetermined reference upper-limit temperature, and may increase the voltage suitable for charging the secondary battery when the temperature detected by the temperature detecting means is lower than a predetermined reference lower-limit temperature.

The charging circuit may comprise one or more diodes to decrease the charging voltage, which is applied to the lithium-ion capacitor unit by an external charger, to a voltage suitable for charging the secondary battery and may apply the resulting voltage to the secondary battery. Specifically, one or more diodes may be connected in series with each other. Here, an anode side of the one or more diodes, which are connected in series, is connected to the positive terminal of the lithium-ion capacitor unit and a cathode side of the one or more diodes, which are connected in series, is connected to the positive terminal of the secondary battery. According to this configuration, the charging voltage of the secondary battery can be easily adjusted by just determining the number of diodes in accordance with the rated voltage of the secondary battery used. Therefore, complicated circuit components such as the switching circuit or the DC/DC converter are not required. Also in this configuration, preferably, the charging circuit includes a switching circuit so that the secondary battery is charged when the switching circuit gets into a conductive state.

As discussed above, the first set voltage is set to prohibit the current discharged from the secondary battery to the load from becoming an overcurrent. The first set voltage is determined such that the overcurrent exceeding the maximum discharging current of the secondary battery may not flow into the load if the voltage of the secondary battery is higher than the voltage of the lithium-ion capacitor unit and the voltage difference between the two voltages is a predetermined value or more when the changeover circuit switches from the first circuit configuration into the second circuit configuration. The term "maximum discharging current of the secondary battery" refers to a maximum current that can be discharged without reducing the life of the secondary battery and that is prescribed by the specifications of the secondary battery. A fixed value may be used as the first set voltage depending on the performance of the secondary battery and the use environment of the secondary battery. If the first set voltage is fixed as mentioned above, the following risk may occur. A discharge current may become higher than the maximum discharging current when the current limiting means in the first discharging circuit is short-circuited as the rate of variation in voltage of the secondary battery during discharging becomes high due to deterioration of the secondary battery, differences in individual secondary batteries to be used, and varying ambient temperature. Thus, the first set voltage may be set to a non-fixed voltage which is determined by subtracting an allowable difference voltage from a voltage of the secondary battery (a voltage between the terminals of the secondary battery), the allowable difference voltage allowing to prohibit a current discharged from the secondary battery from becoming an overcurrent. With the first set voltage set in the non-fixed voltage, the voltage difference between the voltage of the secondary battery and the voltage of the lithium-ion capacitor unit is made small enough to prevent the secondary battery from discharging a current exceeding the maximum discharging current when the changeover circuit switches from the first circuit configuration into the second circuit configuration.

If the changeover circuit is switched into the second circuit configuration, the lithium-ion capacitor unit and the secondary battery are directly connected to each other, and the discharging circuit including the lithium-ion capacitor unit and the secondary battery includes only the internal resistance ($R_C$) of the lithium-ion capacitor unit and the internal resistance ($R_B$) of the secondary battery as resistance components. In the discharging circuit, in order to prevent the secondary battery from discharging a current exceeding the maximum discharging current, the allowable difference voltage may be set such that the value of a current (I) obtained by dividing the voltage difference ($V_{dif}$) between the respective voltages of the secondary battery and the lithium-ion capacitor unit by the sum ($R_C+R_B$) of the respective internal resistances of the secondary battery and the lithium-ion capacitor unit may be the maximum discharging current ($I_{ref}$) of the secondary battery or less. Thus, by using as the allowable difference voltage the value of a voltage obtained as the product of the sum ($R_C+R_B$) of the internal resistance ($R_C$) of the lithium-ion capacitor unit and the internal resistance ($R_B$) of the secondary battery and the maximum discharging current ($I_{ref}$) of the secondary battery, it is possible to prevent the secondary battery from discharging a current exceeding the maximum discharging current, and to minimize the electric power loss due to the current limiting means while preventing degradation of the secondary battery.

The respective voltages of the lithium-ion capacitors forming the lithium-ion capacitor unit may vary because of the difference in capacitance of each capacitor, the difference in initial voltage of each capacitor, the difference in internal resistance including terminal resistance of each capacitor, and so forth. If the lithium-ion capacitors with variations in voltage are charged, a lithium-ion capacitor with lower capacitance reaches the rated voltage faster than a lithium-ion capacitor with higher capacitance, for example. If the lithium-ion capacitors are further continuously charged, the lithium-ion capacitor having reached the rated voltage may be overcharged to shorten the life of the lithium-ion capacitor. During discharging, likewise, the unit lower-limit voltage may not be reached even when some of the lithium-ion capacitors have reached the lower-limit voltage, which may cause the lithium-ion capacitors to overdischarge electricity to shorten the life of the lithium-ion capacitors. Thus, in the present invention, preferably, the lithium-ion capacitor unit may include a plurality of lithium-ion capacitors connected in series with each other and a plurality of voltage equalizing circuits respectively connected in parallel with the plurality of lithium-ion capacitors. According to this configuration, variations in voltage due to variations in capacitance value or the like can be equalized to prevent the life of the lithium-ion capacitors from becoming short.

If the load is a motor that generates a regenerated electric power during deceleration, it is a matter of course that the direct-current power source apparatus may further include a regeneration circuit that charges the lithium-ion capacitor unit and/or the secondary battery of the electric storage system using a regenerated current generated by the motor when the motor is in a regenerating state. The regeneration circuit allows the electric storage system to be charged using a regenerated current generated when the motor is decelerated or when cargo is unloaded with the motor serving as a drive source so that little energy is wasted. Because the life of the secondary battery is shortened if the secondary battery is repeatedly charged frequently and the secondary battery cannot be charged with a low current, the regenerated current is preferably mainly used to charge the lithium-ion capacitor unit.

The direct-current power source apparatus according to the present invention can be utilized as a power source for a transfer apparatus or an automated guided vehicle. Since the direct-current power source apparatus according to the present invention uses the lithium-ion capacitor unit as a main power source and the secondary battery as an auxiliary power source as discussed above, it is possible to reduce the size and the weight of the direct-current power source apparatus by reducing the capacity of the secondary battery, which makes the direct-current power source apparatus suitable for installation in a transfer apparatus.

BRIEF DESCRIPTION OF THE DRAWINGS

FIG. 6 is a flowchart showing the flow of a process performed by a control circuit that controls the changeover circuit in the direct-current power source apparatus according to the fourth embodiment of the present invention.

DESCRIPTION OF THE PREFERRED EMBODIMENTS

Direct-current power source apparatuses according to embodiments of the present invention will be described in detail below with reference to the drawings.

[First Embodiment]

Figure 1:
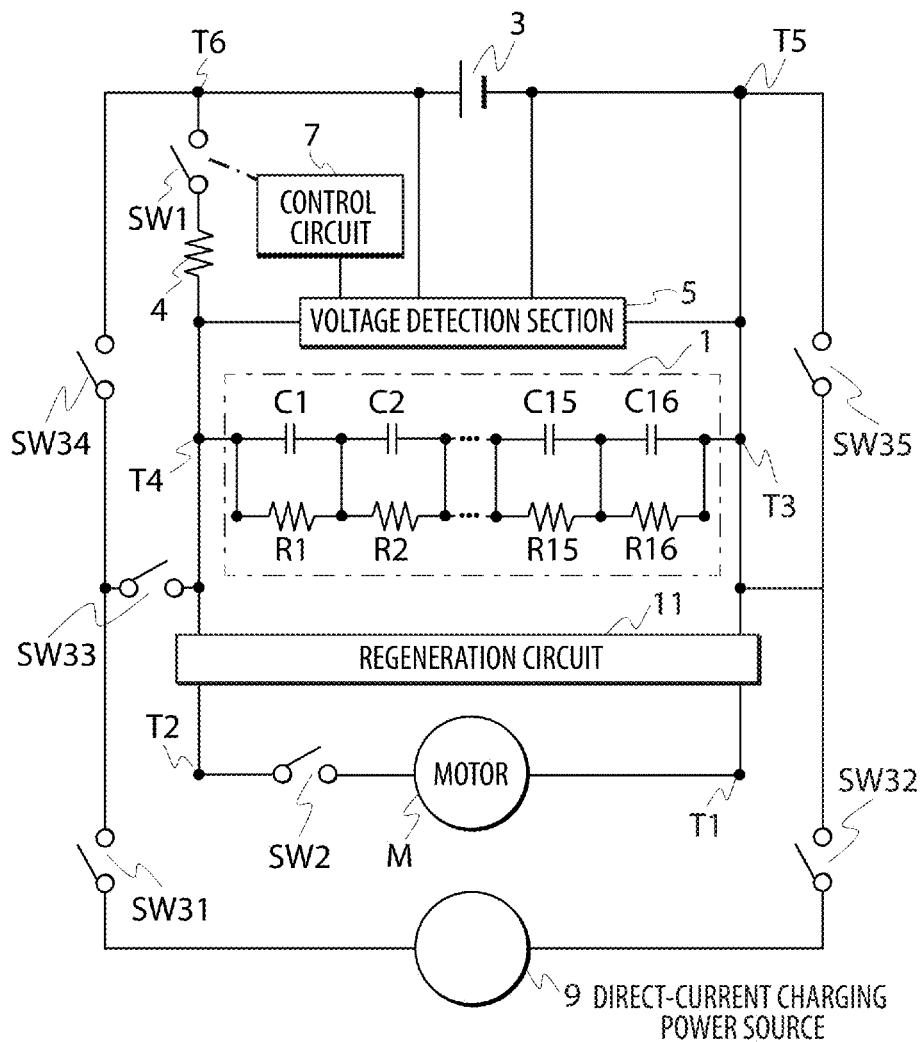
FIG. 1 is a circuit diagram showing an exemplary configuration of a direct-current power source apparatus according to a first embodiment of the present invention.

FIG. 1 is a circuit diagram showing the configuration of a direct-current power source apparatus according to a first embodiment of the present invention applied to an automated guided vehicle. The direct-current power source apparatus according to the embodiment includes a lithium-ion capacitor unit 1, a secondary battery 3 such as a lead-acid battery, a voltage detecting section 5, a control circuit 7, and a switching circuit SW1. The lithium-ion capacitor unit 1 and the secondary battery 3 are connected in parallel with a motor M serving as a load. A power switch SW2 that turns on during an operation is connected in series with the motor M. Specifically, one (input/output portion T3) of paired input/output portions (T3 and T4) of the lithium-ion capacitor unit 1, which is connected to one (input/output portion T1) of paired input/output portions T1 and T2 of the motor M, and one (input/output portion T5) of paired input/output portions (T5 and T6) of the secondary battery 3, are electrically connected to each other. The switching circuit SW1 forming a changeover circuit is disposed between the other input/output portion T4 of the lithium-ion capacitor unit 1 and the other input/output portion T6 of the secondary battery 3. A current limiting resistance 4 is provided to prevent an overcurrent from flowing when the switching circuit SW1 becomes conductive. The voltage detecting section 5 is connected in parallel with the pair of input/output portions T3 and T4 of the lithium-ion capacitor unit 1 to be able to detect the voltage of the lithium-ion capacitor unit 1. The voltage detecting section 5 may be formed using a resistor voltage divider circuit, for example. The lithium-ion capacitor unit 1 and the secondary battery 3 are connected to each other via the switching circuit SW1. The switching circuit SW1 forming a changeover circuit, conduction of which is controlled by the control circuit 7, is disposed between the input/output portion T4 of the lithium-ion capacitor unit 1 and the input/output portion T6 of the secondary battery 3. When the voltage detecting section 5 detects a unit lower-limit voltage of the lithium-ion capacitor unit 1, the control circuit 7 outputs a signal for causing the switching circuit SW1 to get into a conductive state. When switches SW31 and SW32 are closed to connect a direct-current charging power source 9, the control circuit 7 causes the switching circuit SW1 to get into an open (non-conductive) state. Connection of the direct-current charging power source 9 can be easily detected using a limit switch (not shown) or the like. In the embodiment, the motor M is a motor that drives an automated guided vehicle (AGV). The automated guided vehicle regularly returns to a standby station so that the lithium-ion capacitor unit 1 is charged by the direct-current charging power source 9 provided at the standby station.

The lithium-ion capacitor unit 1 in the embodiment includes 16 lithium-ion capacitors C1 to C16 (some of which are not shown in the drawing) connected in series with each other. The capacitance of the lithium-ion capacitor unit 1 is 50 [F] (with each single cell having a capacitance of 800 [F]). If the upper-limit voltage of each of the lithium-ion capacitors C1 to C16 is 3.8 [V], the voltage of the lithium-ion capacitor unit 1 is 60.8 [V]. Resistor elements R1 to R16 (some of which are not shown in the drawing) are respectively connected in parallel with the lithium-ion capacitors C1 to C16. Each of the resistor elements R1 to R16 forms a voltage equalizing circuit that equalizes the voltage of each of the lithium-ion capacitors C1 to C16. A resistor of 1 [kΩ], for example, may be used as each of the resistor elements R1 to R16.

The direct-current charging power source 9 charges the lithium-ion capacitor unit 1 with a voltage that is slightly lower than the upper-limit voltage of 60.8 V discussed above. A valve-regulated lead-acid battery rated at 48 [V] (with 24 cells rated at 2 V connected in series) and 80 Ah is used as the secondary battery 3. The direct-current charging power source 9 is configured to charge both the lithium-ion capacitor unit 1 and the secondary battery 3 with the common direct-current charging power source 9. In the embodiment, the lithium-ion capacitor unit 1 is charged by the direct-current charging power source 9 with the secondary battery 3 being electrically disconnected from the direct-current charging power source 9. The secondary battery 3 is charged by the direct-current charging power source 9 with the lithium-ion capacitor unit 1 being electrically disconnected from the direct-current charging power source 9 after the lithium-ion capacitor unit 1 is completely charged. The lithium-ion capacitor unit 1 requires a charging time of about several tens of seconds. The secondary battery 3 requires a charging time of several tens of minutes to several hours. If the lithium-ion capacitor unit 1 and the secondary battery 3 are charged at the same time, the charging time of the lithium-ion capacitor unit 1 is extended and the advantage of the lithium-ion capacitor unit 1 that it can be charged in a short time is lost. Specifically, when the switches SW31 and SW32 are closed to connect the direct-current charging power source 9, first, a switch SW33 is closed and switches SW34 and SW35 are opened. This allows only the lithium-ion capacitor unit 1 to be charged, which allows the lithium-ion capacitor unit 1 to be charged in a short time. Then, after the lithium-ion capacitor unit 1 is completely charged, the switch S33 is opened and the switches SW34 and SW35 are closed. This allows the secondary battery 3 to be charged. A sufficient time may not be secured to charge the secondary battery 3 when the automated guided vehicle is in a normal operation. Therefore, it is a matter of course that the switches SW34 and SW35 are not allowed to be closed when the automated guided vehicle is in a normal operation but allowed to be closed only when the automated guided vehicle is standing by or not in an operation. Because it takes a long time to charge a lead-acid battery, the lead-acid battery to be charged may be removed from the direct-current power source apparatus and another charged lead-acid battery maybe assembled into the direct-current power source apparatus. In addition, the lead-acid battery in the direct-current power source apparatus may be charged by a rapid charging circuit that is provided at the standby station in a time period in which the motor M is not used. The rapid charging circuit performs voltage/current control suitable for rapidly charging the lead-acid battery.

In the embodiment, the motor M functions as a generator to generate a regenerated electric power during deceleration. Thus, the direct-current power source apparatus is configured to use a regenerated electric power generated during brake regeneration and when cargo is unloaded. Specifically, in the embodiment, an alternating current generated when the motor M is in a regenerating state is converted into a direct current via a regeneration circuit 11 to charge the lithium-ion capacitor unit 1. As a matter of course, the regeneration circuit 11 also functions as a drive circuit for the motor M. A lead-acid battery, which is used as the secondary battery 3 in the embodiment, has good discharging characteristics and poor charging characteristics, and can be charged only with a low current. Therefore, a regenerated current is preferably used to charge the lithium-ion capacitor unit 1. By using the direct-current power source apparatus according to the embodiment in an AGV system that uses a transfer apparatus or an automated guided vehicle, the energy efficiency of the AGV system is improved.

In the embodiment, the lower-limit voltage of each of the lithium-ion capacitors C1 to C16 is 2.2 [V], and thus it is necessary to control the timing to cause the switching circuit SW1 to become conductive such that the voltage of the lithium-ion capacitor unit 1 does not fall below 35.2 [V]. Thus, in the embodiment, the unit lower-limit voltage is set to 36.0 [V], which is higher than 35.2 [V]. When the voltage detecting section 5 detects the unit lower-limit voltage, the control circuit 7 outputs a signal to cause the switching circuit SW1 to get into a conductive state. When the switching circuit SW1 gets into a conductive state, a drive current flows to the motor M from the secondary battery 3, because the voltage of the secondary battery is higher than the decreased voltage of the lithium-ion capacitor unit 1. At the same time, the lithium-ion capacitor unit 1 is partially charged by the secondary battery 3. However, the voltage of the secondary battery 3 is lower than the upper-limit voltage of the lithium-ion capacitor unit 1. Therefore it is necessary for the lithium-ion capacitor unit 1 to be fully charged by the direct-current charging power source 9 when the automated guided vehicle returns to the standby station using an electric power supplied by the secondary battery 3. In the embodiment, in order to prevent the capacitors from overdischarging when the automated guided vehicle cannot return to the standby station for a long period or after the direct-current charging power source 9 has been shut off, the control circuit 7 and the voltage detecting section 5 are powered by the secondary battery 3, rather than the lithium-ion capacitor unit 1. In the embodiment, the secondary battery 3 can supply an electric power to the lithium-ion capacitor unit 1.

In the embodiment, the lithium-ion capacitor unit 1 serves as a main power source, and the secondary battery 3 serves as an auxiliary power source after the voltage of the lithium-ion capacitor unit 1 has decreased. Therefore, after the voltage detecting section 5 detects the unit lower-limit voltage, it is desirable that the automated guided vehicle returns to the standby station to charge the lithium-ion capacitor by the direct-current charging power source 9. Therefore, a control unit of automated guided vehicle may be programmed to generate an alarm signal, stop working, and automatically return to the standby station when the voltage detecting section 5 detects the unit lower-limit voltage and the switching circuit SW1 becomes conductive.

[Second Embodiment]

Figure 2:
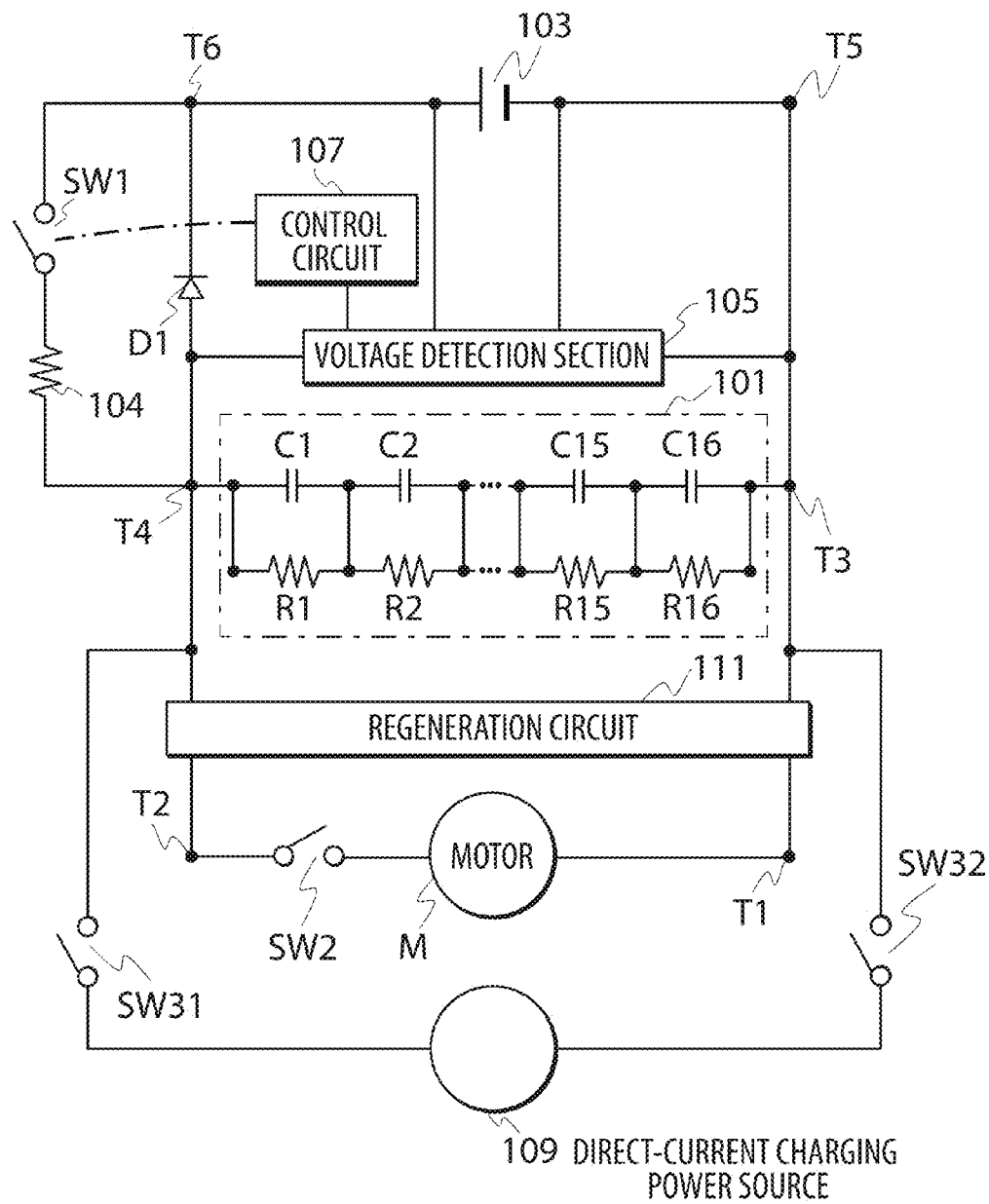
FIG. 2 is a circuit diagram showing an exemplary configuration of a direct-current power source apparatus according to a second embodiment of the present invention.

If a secondary battery, which can be charged in a short time, is used as the secondary battery in the direct-current power source apparatus, it is conceivable to contrive to charge the secondary battery along with charging a lithium-ion capacitor unit. FIG. 2 is a circuit diagram showing the configuration of a direct-current power source apparatus according to a second embodiment in which a diode D1 is disposed in parallel with the switching circuit SW1. In FIG. 2, component parts that are the same as those in the embodiment shown in FIG. 1 are denoted by reference numerals obtained by adding 100 to the reference numerals affixed to their counterparts in FIG. 1 to omit their descriptions. Specifically, the diode D1 has an anode connected to the input/output portion T4 of a lithium-ion capacitor unit 101 and a cathode connected to the input/output portion T6 as a positive terminal of a secondary battery 103. A current from the secondary battery 103 is blocked by the diode D1 when the switching circuit SW1 is open (in a non-conductive state). Therefore, only a direct-current power from the lithium-ion capacitor unit 101 is supplied to the motor M when the switching circuit SW1 is open. The presence of the diode D1 allows the direct-current charging power source 109 to charge the secondary battery 103 at the same time as charging the lithium-ion capacitor unit 101 at the standby station without separately providing a charger for the secondary battery 103.

[Third Embodiment]

Figure 3:
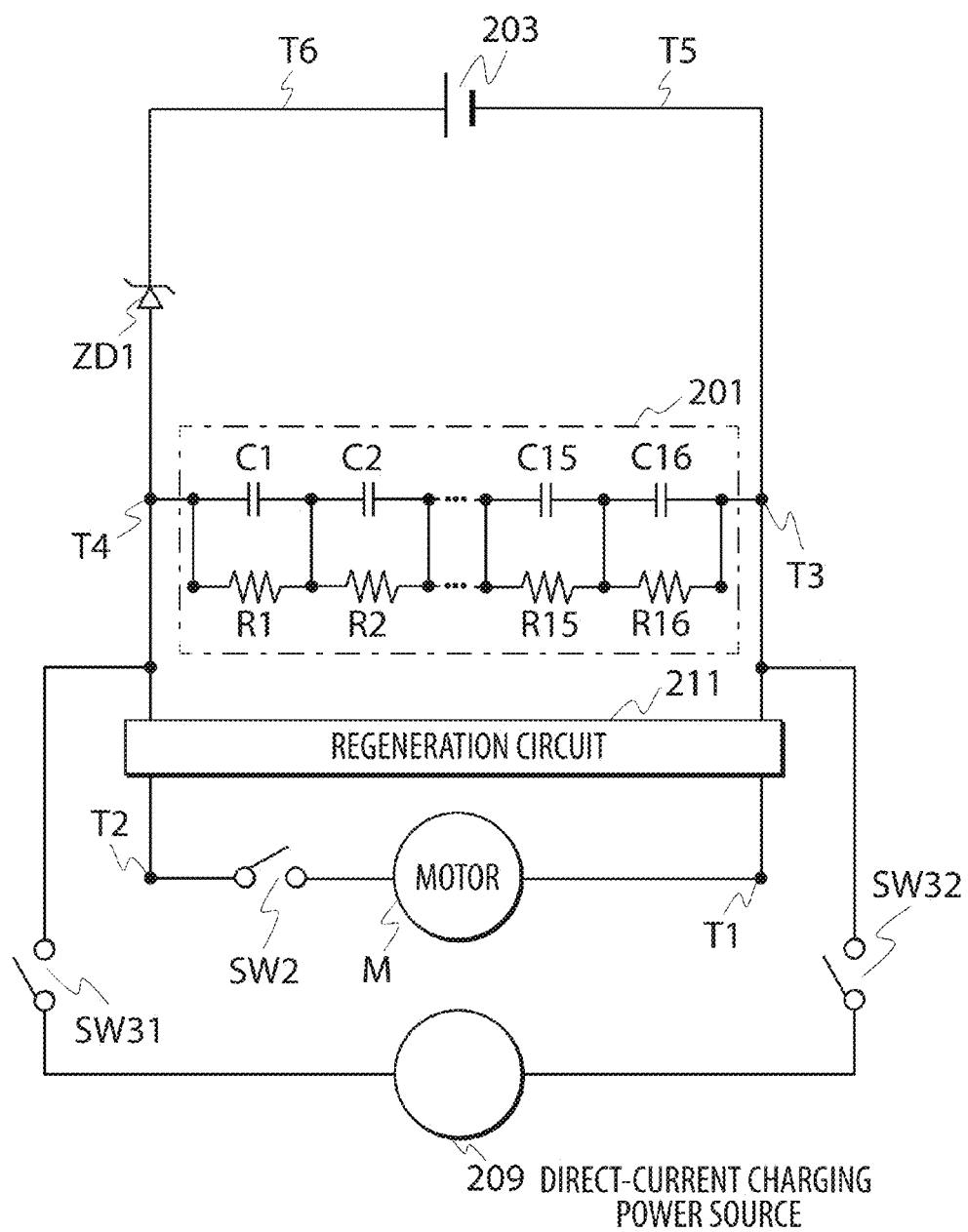
FIG. 3 is a circuit diagram showing an exemplary configuration of a direct-current power source apparatus according to a third embodiment of the present invention.

In the embodiments described above, the switching circuit SW1 is used as the changeover circuit. However, the configuration of the changeover circuit which connects the secondary battery in parallel with the lithium-ion capacitor unit after the voltage of the lithium-ion capacitor unit has decreased is not limited to the switching circuit SW1. FIG. 3 is a circuit diagram showing the configuration of a direct-current power source apparatus according to a third embodiment of the present invention. The embodiment uses a unidirectional conductive device as the voltage detecting section and the changeover circuit. In FIG. 3, component parts that are the same as those in the embodiment shown in FIG. 1 are denoted by reference numerals obtained by adding 200 to the reference numerals affixed to their counterparts in FIG. 1 to omit their descriptions. In the embodiment, a Zener diode ZD1 is used as a unidirectional conductive device which serves as the voltage detecting section and the changeover circuit. That is, the Zener diode ZD1 has an anode connected to the input/output portion T4 of a lithium-ion capacitor unit 201 and a cathode connected to the input/output portion T6 as a positive terminal of a secondary battery 203. In the embodiment, when the difference voltage between the voltage of the secondary battery 203 and the voltage of the lithium-ion capacitor unit 201 reaches a breakdown voltage (Zener voltage) because the motor M consumes electric charge of the lithium-ion capacitor unit 201, an electric power is supplied through the conducted Zener diode ZD1 from the secondary battery 203 to the motor M. At the same time, a charging current flows from the secondary battery 203 to the lithium-ion capacitor unit 201. However, the charging current is shut off when the difference voltage becomes lower than the Zener voltage. Therefore, the automated guided vehicle preferably must return to the standby station at which the direct-current charging power source 209 is installed in order to charge the lithium-ion capacitor unit 201 as soon as possible, after supply of an electric power from the secondary battery 203 to the load is started. According to the embodiment, it is possible to prevent the voltage of the lithium-ion capacitor unit from falling below the unit lower-limit voltage and to continue the supply of an electric power to the motor with a simple circuit without using a voltage detecting section that detects the voltage of the lithium-ion capacitor unit or a control circuit.

[Fourth Embodiment]

Figure 4:
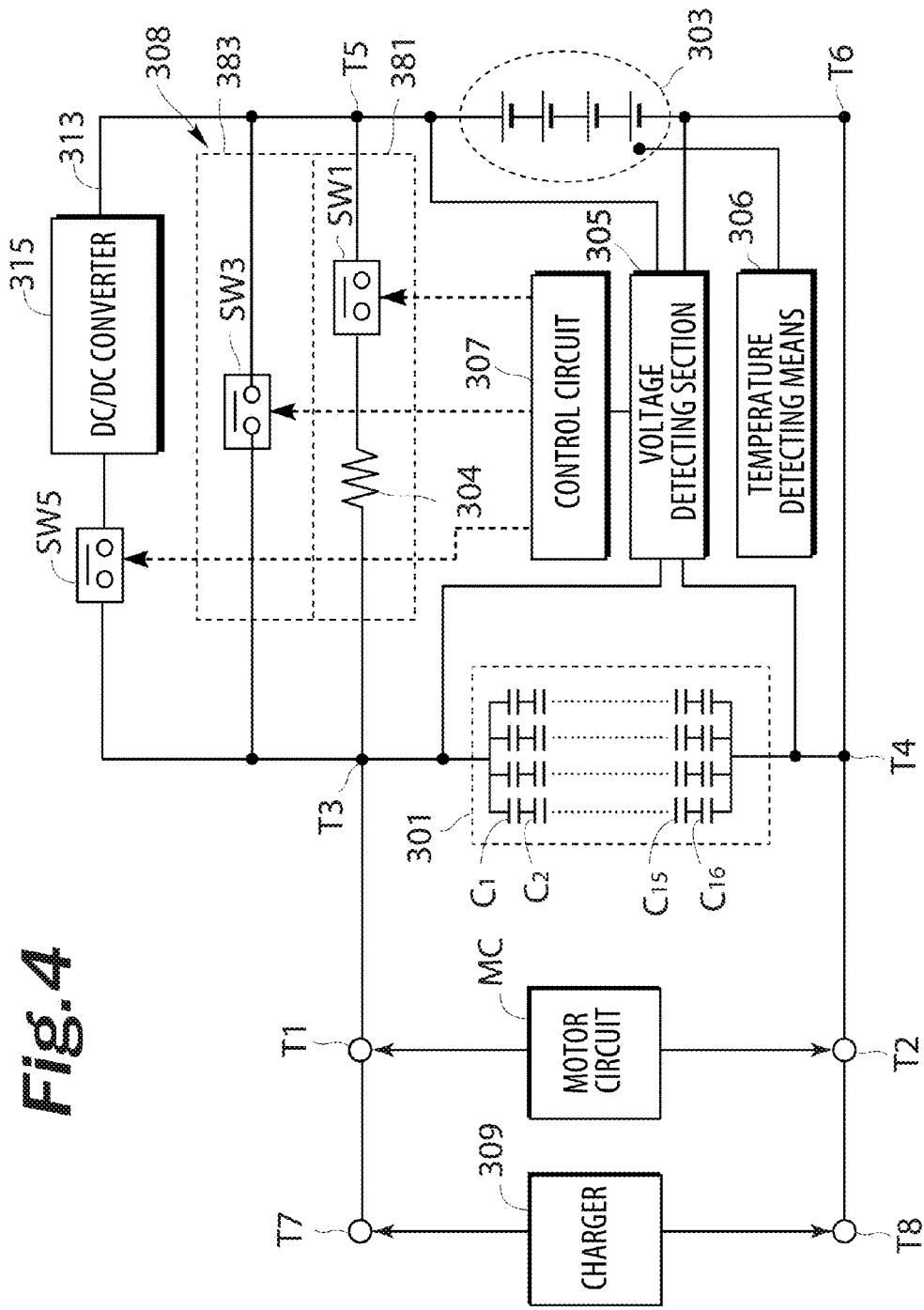
FIG. 4 is a circuit diagram showing an exemplary configuration of a direct-current power source apparatus according to a fourth embodiment of the present invention.

FIG. 4 is a circuit diagram showing the configuration of a direct-current power source apparatus according to a fourth embodiment in which the changeover circuit is formed by a first discharging circuit and a second discharging circuit. In FIG. 4, component parts that are the same as those in the embodiment shown in FIG. 1 are denoted by reference numerals obtained by adding 300 to the reference numerals affixed to their counterparts in FIG. 1 to omit their descriptions.

A lithium-ion capacitor unit 301 in the embodiment is formed by a module including four capacitor arrays connected in parallel with each other, each of the capacitor arrays including 16 lithium-ion capacitors C1 to C16 connected in series with each other (some of which are not shown in the drawing). The capacitance of the lithium-ion capacitor unit 301 is 450 [F] (with each single cell having a capacitance of 1800 [F]). If the upper-limit voltage of each of the lithium-ion capacitors C1 to C16 is 3.8 [V], the voltage of the lithium-ion capacitor unit 301 is 60.8 [V]. The lower-limit voltage of the lithium-ion capacitors C1 to C16 is 2.2 [V]. Thus, in the embodiment, the unit lower-limit voltage ($V_1$) is set to 40.0 [V] so that the voltage of the lithium-ion capacitor unit 301 does not fall below 35.2 [V] to prevent the system in the load from going down. Resistor elements (not shown in the drawing) are respectively connected in parallel with the lithium-ion capacitors C1 to C16. Each of the resistor elements forms a voltage equalizing circuit that equalizes the voltage of each of the lithium-ion capacitors C1 to C16. A resistor of 1 [kΩ], for example, may be used as the resistor elements for voltage equalization. A valve-regulated lead-acid battery rated at 48.0 [V] (with 24 cells rated at 2 [V] connected in series) and 80 [Ah] is used as a secondary battery 303.

A changeover circuit 308 is formed by a first discharging circuit 381 and a second discharging circuit 383. The first discharging circuit 381 is formed by a switch SW1 and a current limiting resistor 304 connected in series with the switch SW1. The second discharging circuit 383 is formed to include a switch SW3. As discussed later, the current limiting resistor 304 is provided for the purpose of preventing the secondary battery 303 from discharging an overcurrent when the switch SW1 becomes conductive. Although not shown, a motor drive circuit including an inverter circuit that operates in accordance with a control command is connected to a motor circuit MC including a motor serving as a load.

In the embodiment, the pair of terminals T3 and T4 of the lithium-ion capacitor unit 301 are respectively electrically connected to the pair of terminals T1 and T2 of the motor circuit MC. The terminal T1 of the motor circuit MC, the terminal T3 of the lithium-ion capacitor unit 301, and the terminal T5 of the secondary battery 303 are positive terminals. The terminal T2 of the motor circuit MC, the terminal T4 of the lithium-ion capacitor unit 301, and the terminal T6 of the secondary battery 303 are negative terminals commonly connected to a ground terminal of a charger 309. The first discharging circuit 381 is disposed between the positive terminal T3 of the lithium-ion capacitor unit 301 and the positive terminal T6 of the secondary battery 303. The second discharging circuit 383 is connected in parallel with the first discharging circuit 381. Hence, the lithium-ion capacitor unit 301 and the secondary battery 303 are connected in parallel with each other via the changeover circuit 308 including the first discharging circuit 381 and the second discharging circuit 383.

The charger (direct-current charging power source) 309 is provided at a standby station for an automated guided vehicle. Each time the automated guided vehicle returns to the standby station, the terminals T1 and T2 are connected to output terminals T7 and T8 of the charger 309 to perform a charging operation. When the charger 309 and the direct-current power source apparatus of the automated guided vehicle are connected to each other, the charger 309 charges the lithium-ion capacitor unit 301 with a charging voltage that is slightly lower than the upper-limit voltage of the lithium-ion capacitor unit 301. In the embodiment, a charging circuit 313 for the secondary battery 303 is connected between the terminal T1 and the terminal T5 of the secondary battery 303. The charging circuit 313 is formed by connecting a switch SW5 and a DC/DC converter 315 in series with each other. When the switch SW5 gets into a conductive state in accordance with a conduction signal from a control circuit 307 with the charger 309 connected to the direct-current power source apparatus, charging of the secondary battery 303 is started. If the voltage detecting section 305 detects that the voltage of the secondary battery 303 has fallen down to or below a charging start voltage determined in advance, the control circuit 307 outputs a conduction signal for causing the switch SW5 to get into a conductive state when the charger 309 is connected to the direct-current power source apparatus. The switch SW5 is maintained in a conductive state while the on command is output. The DC/DC converter 315 applies to the secondary battery 303 a charging voltage obtained by decreasing a charging voltage of the lithium-ion capacitor unit 301 to a voltage suitable for charging the secondary battery 303. If the charging current from the DC/DC converter 315 is too high, the secondary battery 303 may be degraded. Therefore, the DC/DC converter 315 is configured to charge the secondary battery 303 with a current of about 1 to 7 [A], for example. When the voltage detecting section 305 detects that the voltage between the terminals T5 and T6 of the secondary battery 303 reaches a set voltage determined in advance (charge completion voltage), the control circuit 307 stops outputting the on command to open the switch SW5, which completes charging. In the embodiment, the switch SW5 is opened except when the secondary battery 303 is charged, and thus a standby electric power is not consumed. Therefore, the lithium-ion capacitor unit 301 can be quickly charged without being affected by the charging state of the secondary battery 303.

In the embodiment, temperature detecting means 306 for detecting the ambient temperature of the secondary battery 303 is also provided. An output of the temperature detecting means 306 is input to a control section (not shown) of the DC/DC converter 315. The control section (not shown) adjusts the output voltage of the DC/DC converter 315 in accordance with the ambient temperature of the secondary battery 303 detected by the temperature detecting means 306. Specifically, the control section (not shown) adjusts the output voltage of the DC/DC converter 315 such that the charging voltage of the secondary battery 303 is decreased when the ambient temperature becomes higher, and increased when the ambient temperature becomes lower. This allows the secondary battery 303 to be charged with a charging voltage that is suitable for variations in ambient temperature, thereby alleviating a stress received by the secondary battery 303 due to overcharging or insufficient charging to extend the life of the secondary battery 303.

[Control of Changeover Circuit]

Figure 5A:
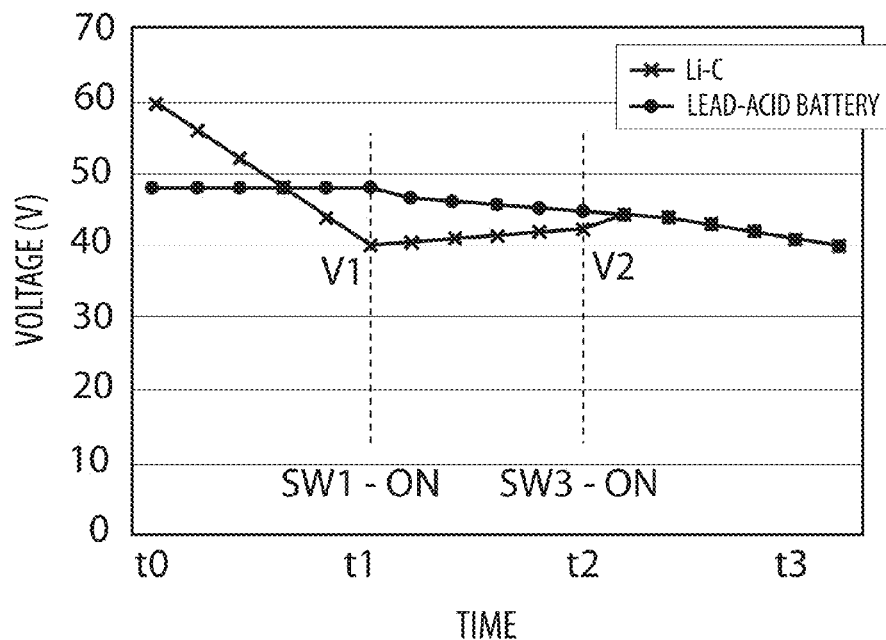
FIGS. 5A and 5B are each a time chart showing the timing at which a changeover circuit in the direct-current power source apparatus according to the fourth embodiment of the present invention performs switching.

Next, a changeover operation of the changeover circuit 308 controlled by the control circuit 307 will be described with respect to FIGS. 5A, 5B, and 6.

In the direct-current power source apparatus according to the embodiment, only the lithium-ion capacitor unit 301 supplies an electric power to the motor circuit MC while the charging voltage of the lithium-ion capacitor unit 301 is higher than the unit lower-limit voltage $V_1$ (40.0 [V]). At this time, both the switch SW1 and the switch SW3 in the changeover circuit 308 are opened. If the voltage detecting section 305 detects that a voltage $V_{LIC}$ between the terminals of the lithium-ion capacitor unit 301 has decreased to the unit lower-limit voltage $V_1$ (40.0 [V]) (step ST301), the control circuit 307 outputs a conduction signal for causing the switch SW1 to get into a conductive state (step ST302). In this state, the secondary battery 303 has been charged to a voltage that is higher than the voltage of the lithium-ion capacitor unit 301 which has decreased and the changeover circuit 308 takes a first circuit configuration. While the switch SW1 is in a conductive state, the secondary battery 303 supplies a drive current to the motor circuit MC and supplies a charging current to the lithium-ion capacitor unit 301 at the same time.

If the voltage of the secondary battery 303 at this time is 48.0 [V], the voltage difference between the voltage of the secondary battery 303 and the voltage of the lithium-ion capacitor unit 301, which has decreased to the unit lower-limit voltage $V_1$ (40.0 [V]), is 8.0 [V]. For example, if the internal resistance of the lithium-ion capacitor unit 301 is 10 [mΩ] and the internal resistance of the secondary battery 303 is also 10 [mΩ], and in the absence of the current limiting resistor 304, the secondary battery 303 may discharge a maximum instantaneous current of as high as 400 [A] in the calculation. Thus, in order to limit the current discharged from the secondary battery 303, the secondary battery 3 charges the lithium-ion capacitor unit 301 via the first discharging circuit 381 including the current limiting resistor 304. Preferably, the current limiting resistor 304 has a resistance of about 3.0 [Ω]/50 [W] to limit the discharging current to up to about 3 [A] if the voltage difference between the respective voltages of the secondary battery 303 and the lithium-ion capacitor unit 301 is 8.0 [V], for example. In practice, however, it is necessary to determine the resistance value of the current limiting resistor 304 in consideration of the electric power value that is enough to supply an electric power to the load.

After the switch SW1 gets into a conductive state, if the voltage detecting section 305 detects that the voltage of the lithium-ion capacitor unit 301 has become a first set voltage $V_2$ (42.5 [V]) that is higher than the unit lower-limit voltage $V_1$ or a second set voltage $V_3$ (37.5 [V]) that is lower than the unit lower-limit voltage $V_1$ (step ST303), the control circuit 307 outputs a conduction signal for causing the switch SW3 to get into a conductive state (step ST304). The changeover circuit 308 takes a second circuit configuration while the switch SW3 is in a conductive state. The switch SW1 maybe opened after the switch SW3 is turned on.

While the switch SW3 is in a conductive state, the first discharging circuit 381 is short-circuited by the second discharging circuit 383, and thereafter the current discharged from the secondary battery 303 is supplied from the second discharging circuit 383 to the motor circuit MC and the lithium-ion capacitor unit 301. In the case where the voltage of the lithium-ion capacitor unit 301 rises to the first set voltage $V_2$, a required electric power can be supplied to the motor circuit (load) MC using the secondary battery 303 without an overcurrent flowing through the motor circuit MC and the lithium-ion capacitor unit 301 can be charged by the secondary battery 303, after the changeover circuit 308 takes the first circuit configuration (FIG. 5A). The first set voltage $V_2$ is set to prohibit the current discharged from the secondary battery 303 to the load M from becoming an overcurrent. Thus, in this state, the current limiting resistor 304 fails to prevent the generation of overcurrent, but is merely cause for electric power loss. Then, the changeover circuit 308 switches into the second circuit configuration to disconnect the current limiting resistor 304, thereby avoiding the generation of an electric power loss in the current limiting resistor 304 and alleviating the load on the secondary battery 303. As a result, this may retard deterioration of the capacity of the secondary battery 303.

It is necessary to set the first set voltage $V_2$ such that the current discharged from the secondary battery 303 to the load when the changeover circuit 308 switches from the first circuit configuration into the second circuit configuration does not exceed the maximum discharging current. A fixed value maybe used as the first set voltage $V_2$ as described above. In the case where a fixed value is used as the first set voltage $V_2$, however, a current that is higher than the maximum discharging current may be discharged when the current limiting means in the first discharging circuit is short-circuited, if the rate of variations in voltage of the secondary battery 303 during discharging is high because of conditions such as degradation of the secondary battery 303, individual difference, and the ambient temperature. Thus, the first set voltage $V_2$ is preferably determined by subtracting an allowable difference voltage $V_{dif}$ which allows to prohibit a current discharged from the secondary battery 303 from becoming an overcurrent, from the value of a voltage $V_B$ (between the terminals) of the secondary battery 303 as represented by the formula (1):

$$V_2 = V_B - V_{dif} \quad (1)$$

The allowable difference voltage $V_{dif}$ can be calculated by the formula (2):

$$V_{dif} = I_{ref}(R_C + R_B) \quad (2)$$

where $I_{ref}$ is the maximum discharging current of the secondary battery 303, $R_C$ is the internal resistance of the lithium-ion capacitor unit 301, and $R_B$ is the internal resistance of the secondary battery 303. For example, in the case of $I_{ref}$=10 [A], $R_C$=10 [mΩ], and $R_B$=10 [mΩ], $V_{dif}$=200 [mV] is obtained. The control circuit 307 stores the allowable difference voltage $V_{dif}$ calculated in advance using the formula (2), and the control circuit 307 determines the first set voltage $V_2$ on the basis of the formula (1). Then, if the voltage detecting section 5 detects that the voltage of the lithium-ion capacitor unit 301 has risen to the first set voltage $V_2$, the control circuit 307 outputs a switching command to the changeover circuit 308.

The formula (2) is determined for the following reasons. That is, in the case where the changeover circuit 308 takes the second circuit configuration, the lithium-ion capacitor unit 301 and the secondary battery 303 are directly connected to each other. At this time, the discharging circuit including the lithium-ion capacitor unit 301 and the secondary battery 303 includes only the internal resistance ($R_C$) of the lithium-ion capacitor unit 301 and the internal resistance ($R_B$) of the secondary battery 303 as resistance components. In the circuit configuration, in order to prevent the secondary battery 303 from discharging a current exceeding the maximum discharging current, the value of a current (I) obtained by dividing the voltage difference between the respective voltages of the secondary battery 303 and the lithium-ion capacitor unit 301 by the sum ($R_C+R_B$) of the respective internal resistances of the secondary battery 303 and the lithium-ion capacitor unit 301 may be set to the maximum discharging current ($I_{ref}$) of the secondary battery 303 or less. That is, the allowable difference voltage $V_{dif}$ and the maximum discharging current ($I_{ref}$) may satisfy the following formula (3):

$$V_{dif}/(R_C+R_B)=I \leq I_{ref} \quad (3)$$

Thus, by using as the allowable difference voltage $V_{dif}$ the value of a voltage obtained as the product [the formula (2) above] of the sum ($R_C+R_B$) of the internal resistance of the lithium-ion capacitor unit 301 and the internal resistance of the secondary battery 303 and the maximum discharging current ($I_{ref}$) of the secondary battery 303, it is possible to minimize the electric power loss due to the current limiting resistance 304 while preventing degradation of the secondary battery 303.

Figure 5B:
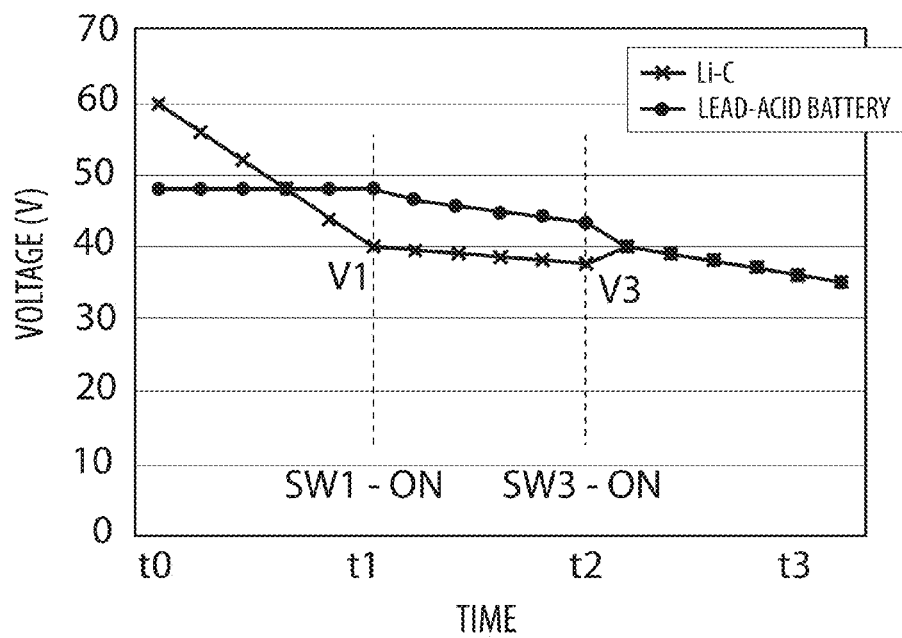

If the voltage of the lithium-ion capacitor unit 301 falls down to the second set voltage $V_3$, supply of a current to the load via the current limiting resistance 304 cannot provide a sufficient electric power because the load is too large at the time that the changeover circuit 308 is switched into the first circuit configuration (in which the switch SW1 is in a conductive state), and the lithium-ion capacitor unit 301 continuously discharges an electricity (FIG. 5B). If the current limiting resistor 304 remains or is left in the discharging circuit, discharging from the lithium-ion capacitor unit continues and causes a risk of decreasing the voltage of each of the lithium-ion capacitors to the lower-limit voltage. Thus, the changeover circuit 308 switches into the second circuit configuration (in which the switch SW3 is in a conductive state) to disconnect the current limiting resistor 304 from the discharging circuit, which allows the supply of a required electric power to the motor circuit (load) MC and prevents a decrease in voltage of the lithium-ion capacitor unit 301. From such a viewpoint, the second set voltage $V_3$ is set to prohibit the voltage of each of the lithium-ion capacitors from falling down to the lower-limit voltage or less.

[Fifth Embodiment]

Figure 7:
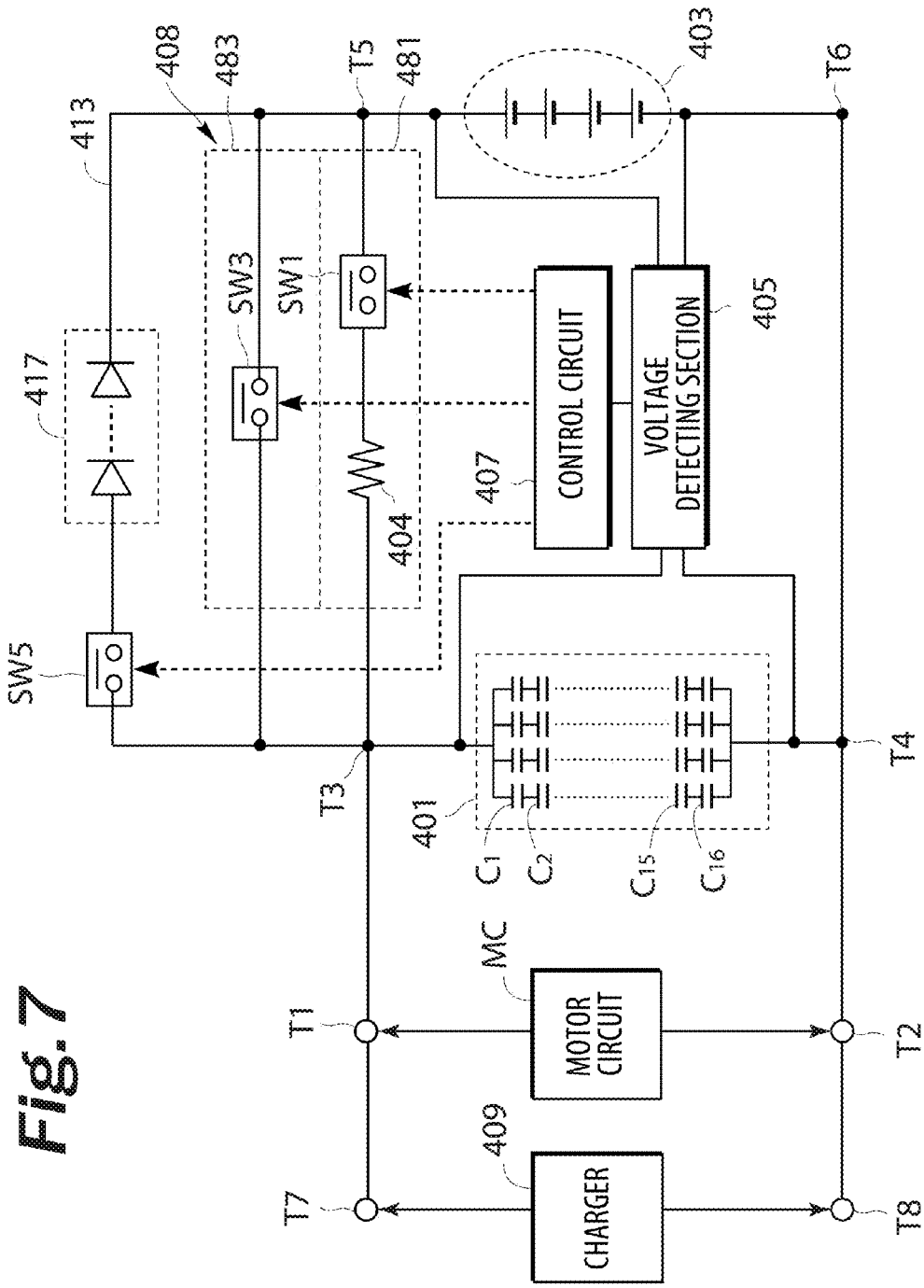
FIG. 7 is a circuit diagram showing an exemplary configuration of a direct-current power source apparatus according to a fifth embodiment of the present invention.

In a charging circuit for a secondary battery, as shown in FIG. 7, a plurality of diodes connected in series with each other maybe used in place of a DC/DC converter as means for decreasing the charging voltage. FIG. 7 shows the configuration of a direct-current power source apparatus according to a fifth embodiment of the present invention in which diodes are used in a charging circuit 413. In FIG. 7, component parts that are the same as those in the embodiment shown in FIG. 4 are denoted by reference numerals obtained by adding 100 to the reference numerals affixed to their counterparts in FIG. 4 to omit their descriptions. In the embodiment, a plurality of diodes are connected in series with each other to form a diode array 417, which includes an anode connected to the terminal T3 of a lithium-ion capacitor unit 401 and a cathode connected to the positive terminal T5 of a secondary battery 403. According to this configuration, the charging voltage of the secondary battery 403 can be easily adjusted by just determining the number of diodes in accordance with the rated voltage of the secondary battery 403 used without using a DC/DC converter.

According to the present invention, a lithium-ion capacitor unit can be fully utilized for the lithium-ion capacitor unit included in the electric storage system. In addition, the life of the lithium-ion capacitor unit can be extended. Moreover, the supply of an electric power to a load can be continued even if the voltage of the lithium-ion capacitor unit has decreased. Further, a burden on a secondary battery can be reduced to suppress degradation of the secondary battery and extend the life of the secondary battery. A direct-current power source apparatus capable of stably supplying an electric power can be provided.

While certain features of the invention have been described with reference to example embodiments, the description is not intended to be construed in a limiting sense. Various modifications of the example embodiments, as well as other embodiments of the invention, which are apparent to persons skilled in the art to which the invention pertains, are deemed to lie within the spirit and scope of the invention.

What is claimed is:

1. A direct-current power source apparatus comprising:
   an electric storage system capable of being charged and discharging an electricity to a load to supply a direct-current power to the load, wherein
   the electric storage system comprises:
      a lithium-ion capacitor unit connected in parallel with the load;
      a secondary battery connected in parallel with the load;
      a voltage detecting section for detecting a voltage of the lithium-ion capacitor unit; and
      a changeover circuit that electrically disconnects the secondary battery from the load before the voltage detecting section detects a unit lower-limit voltage of the lithium-ion capacitor unit, and that connects the secondary battery in parallel with the load and the lithium-ion capacitor unit when the voltage detecting section detects the unit lower-limit voltage.

2. The direct-current power source apparatus according to claim 1, wherein:
   one of paired input/output portions of the lithium-ion capacitor unit, which are connected to paired input portions of the load, and one of paired input/output portions of the secondary battery are electrically connected to each other; and
   the changeover circuit includes a controllable switching circuit that is disposed between the other of the paired of input/output portions of the lithium-ion capacitor unit and the other of the paired of input/output portions of the secondary battery and that gets into a conductive state when the voltage detecting section detects the unit lower-limit voltage.

3. The direct-current power source apparatus according to claim 2, the electric storage system further comprising:
   a diode with an anode connected to the other of the paired input/output portions of the lithium-ion capacitor unit and with a cathode connected to the input/output portion as a positive terminal of the secondary battery.

4. The direct-current power source apparatus according to claim 1, wherein
   the voltage detecting section is powered by the secondary battery.

5. The direct-current power source apparatus according to claim 1, wherein:
   one of paired input/output portions of the lithium-ion capacitor unit, which are connected to a pair input portions of the load, and one of paired input/output portions of the secondary battery are electrically connected to each other; and
   a unidirectional conductive device is electrically connected between the other of the pair of input/output portions of the lithium-ion capacitor unit and the other of the pair of input/output portions of the secondary battery, the unidirectional conductive device getting into a conductive state when the voltage of the lithium-ion capacitor unit falls down to or below the unit lower-limit voltage, and the unidirectional conductive device functioning as the voltage detecting section and the changeover circuit.

6. The direct-current power source apparatus according to claim 5, wherein
   the unidirectional conductive device comprises one or more constant-voltage diodes.

7. The direct-current power source apparatus according to claim 1, wherein
   the lithium-ion capacitor unit includes a plurality of lithium-ion capacitors connected in series with each other and a plurality of voltage equalizing circuits respectively connected in parallel with the plurality of lithium-ion capacitors.

8. The direct-current power source apparatus according to claim 1, further comprising:
   a regeneration circuit that charges the lithium-ion capacitor unit and/or the secondary battery of the electric storage system using a regenerated current generated by the load when the load is in a regenerating state.

9. The direct-current power source apparatus according to claim 1, wherein
   when the secondary battery is connected in parallel with the load and the lithium-ion capacitor unit, the changeover circuit initially takes a first circuit configuration in which the secondary battery is connected in parallel with the load and the lithium-ion capacitor unit via a first discharging circuit including current limiting means, and thereafter takes a second circuit configuration in which the secondary battery is connected in parallel with the load and the lithium-ion capacitor unit via a second discharging circuit not including the current limiting means when it is detected that the voltage of the lithium-ion capacitor unit has risen to a first set voltage that is higher than the unit lower-limit voltage or that the voltage of the lithium-ion capacitor unit has decreased to a second set voltage that is lower than the unit lower-limit voltage.

10. The direct-current power source apparatus according to claim 9, wherein
    the second discharging circuit comprises a short circuit that short-circuits the current limiting means in the first discharging circuit.

11. The direct-current power source apparatus according to claim 9, further comprising:
    a charging circuit that is brought into an operating state to charge the secondary battery when a charging voltage is applied to the lithium-ion capacitor unit by an external charger.

12. The direct-current power source apparatus according to claim 11, wherein the charging circuit includes a switching circuit so that the secondary battery is charged when the switching circuit gets into a conductive state.

13. The direct-current power source apparatus according to claim 11, wherein
the charging circuit includes a DC/DC converter that decreases the charging voltage to a voltage suitable for charging the secondary battery.

14. The direct-current power source apparatus according to claim 13, further comprising:
temperature detecting means for detecting an ambient temperature, wherein
the DC/DC converter decreases the voltage suitable for charging the secondary battery when the temperature detected by the temperature detecting means becomes higher than a predetermined reference upper-limit temperature, and increases the voltage suitable for charging the secondary battery when the temperature detected by the temperature detecting means becomes lower than a predetermined reference lower-limit temperature.

15. The direct-current power source apparatus according to claim 9, further comprising:
a charging circuit that includes one or more diodes and that, when a charging voltage is applied to the lithium-ion capacitor unit by an external charger, decreases the charging voltage to a voltage suitable for charging the secondary battery to apply the resulting voltage to the secondary battery.

16. The direct-current power source apparatus according to claim 15, wherein
the charging circuit includes a switching circuit so that the secondary battery is charged when the switching circuit gets into a conductive state.

17. The direct-current power source apparatus according to claim 9, wherein
the first set voltage is determined by subtracting an allowable difference voltage from a voltage between the paired input/output portions of the secondary battery, the allowable difference voltage allowing a current discharged from the secondary battery to be prohibited from becoming an overcurrent.

18. The direct-current power source apparatus according to claim 17, wherein
the allowable difference voltage is determined as the product of the sum of an internal resistance of the lithium-ion capacitor unit and an internal resistance of the secondary battery and a maximum discharging current of the secondary battery.

19. A transfer apparatus comprising the direct-current power source apparatus according to claim 1 as a power source.

20. A method of charging the lithium-ion capacitor unit and the secondary battery in the direct-current power source apparatus according to claim 1 using a common direct-current charging power source, the method comprising the steps of:
charging the lithium-ion capacitor unit with the secondary battery electrically disconnected from the direct-current charging power source; and
charging the secondary battery with the lithium-ion capacitor unit electrically disconnected from the direct-current charging power source after the lithium-ion capacitor unit is completely charged.

* * * * *